United States Patent
Kreutmair

Patent Number: 4,706,464
Date of Patent: Nov. 17, 1987

[54] METHOD AND APPARATUS FOR THE AUTOMATIC CONTROL OF A SORPTION HEAT TRANSFER PLANT

[75] Inventor: Josef Kreutmair, Pfaffenhofen, Fed. Rep. of Germany

[73] Assignee: Man Technologie GmbH, Munich, Fed. Rep. of Germany

[21] Appl. No.: 835,971

[22] Filed: Mar. 4, 1986

[30] Foreign Application Priority Data

Mar. 6, 1985 [DE] Fed. Rep. of Germany ....... 3507887

[51] Int. Cl.[4] ............................................. F25B 15/00
[52] U.S. Cl. ....................................... 62/101; 62/148; 62/476
[58] Field of Search .......................... 62/148, 476, 101

[56] References Cited

U.S. PATENT DOCUMENTS 4,580,407  4/1986  Aime et al. ........................... 62/148
4,596,122  6/1986  Kantner ............................. 62/148 X Primary Examiner—Lloyd L. King
Attorney, Agent, or Firm—Roberts, Spiecens & Cohen

[57] ABSTRACT

A method for the automatic control of absorption refrigeration plant or a heat pump, by control of the supply of refrigerant to the evaporator of the plant as dependent on the temperature and the pressure of the vapor issuing from the evaporator in such a way that there is a slight degree of overheating of the vapor. At the same time the boiler power is varied in accordance with the temperature of the refrigerant vapor emerging from the boiler. The cooling for the expelled refrigerant vapor is provided by the rich solution from an absorber in a dephlegmatizer having two stages and the solution cooling circuit includes an intermediate cooler for enhancing the rectifying process when marginal conditions are unfavorable.

9 Claims, 1 Drawing Figure

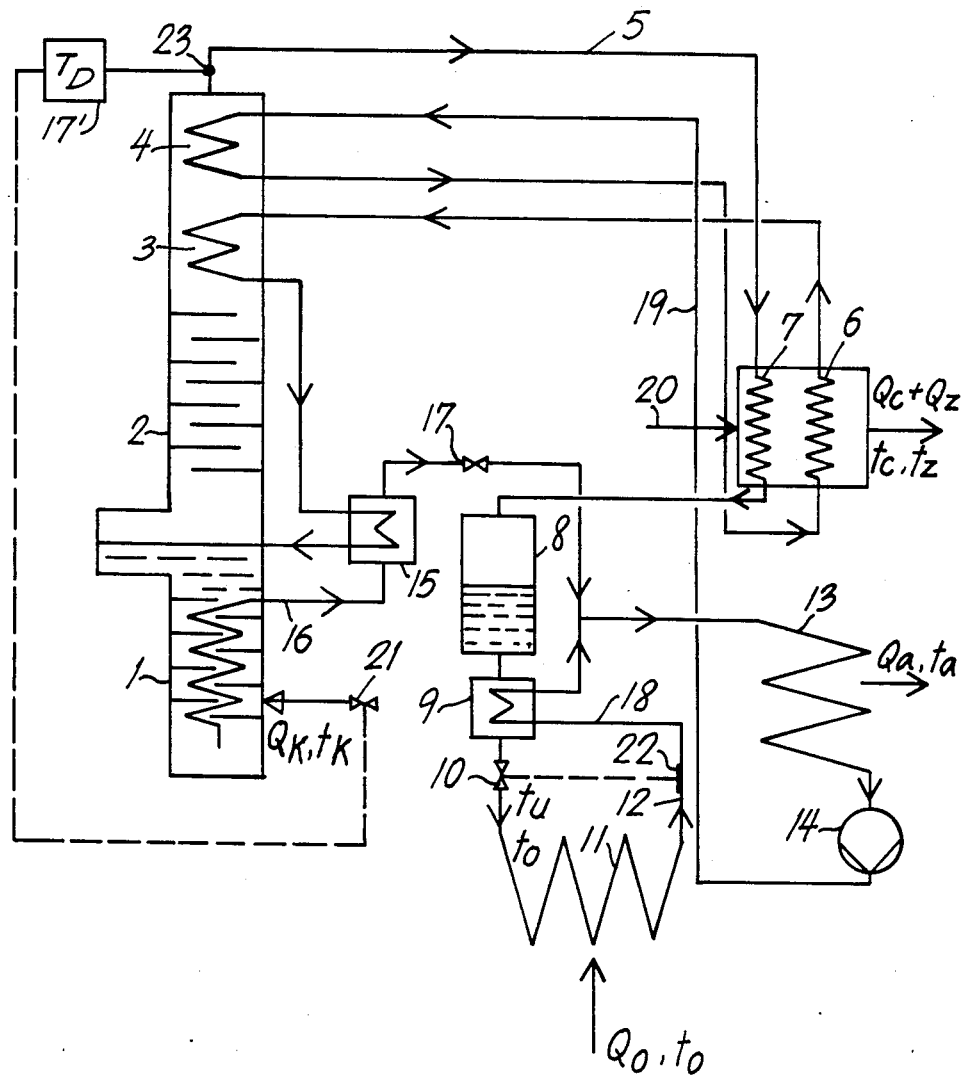

4,706,464

METHOD AND APPARATUS FOR THE AUTOMATIC CONTROL OF A SORPTION HEAT TRANSFER PLANT

FIELD OF THE INVENTION

The invention relates to a method for the automatic control of an absorption heat transfer plant, such as an absorption refrigeration plant or heat pumps, and more particularly to such plant comprising a refrigerant circuit and a solution circuit, and a coolant circuit including a condenser and an absorber for the coolant to flow through, in the case of which for adaptation to the power requirement, the supply of refrigerant to the evaporator is automatically controlled in a way dependent on the condition in the evaporator and the return of the weak solution to the absorber is automatically controlled, and in which for cooling the coolant vapor emerging from the expeller, use is made of enriched solution from the absorber and the boiler power is able to be varied.

BACKGROUND AND PRIOR ART

Due to their various different fluid circuits, sorption machines have to provide for an accurate and simultaneous automatic control of the different processes so as to take into account external factors, such as the temperature of the external air and the anergy source temperature, the power of the boiler and the necessary cooling and heat power.

In order to achieve optimum process conditions, attempts have been made to achieve a substantially automatic control, at least of parts of the working process.

The German Pat. No. 718,956 describes a method of the initially mentioned type which is designed for controlling an absorption refrigeration plant, and which varies the power of the refrigeration plant in accordance with the rate of flow or the desired minimum temperature of the material to be cooled.

A substantial degree of agreement between the refrigerating power and the required refrigerating action is produced in the known method by simultaneous control of the boiler power, the cooler action in the rectifier or the dephlegmatizer, the supply of refrigerant to the evaporator and the solution circuit, the rate of the enriched solution supplied to the expeller being dependent on the final temperature or the amount of material to be cooled. These control operations, that take place automatically and are caused by an operational parameter relevant for the process, such as temperature, pressure and liquid level, are however only such as to take into account the refrigerating mode of a sorption plant.

SUMMARY OF THE INVENTION

One object of the invention is to provide a method of the initially specified type involving the use of automatic control, which is such that the plant may be used both for refrigerating and also for heat pump operations.

In order to achieve this or other aims appearing in the course of the present specification, the supply of refrigerant to the evaporator and the return of the weak solution to the absorber are so controlled that a minor degree of overheating, as related to the pure refrigerant, is maintained at the outlet of the evaporator, and the boiler power is controlled so as to be dependent on the temperature of the refrigerant vapor and the cooling of the refrigerant vapors with the enriched solution takes place in two stages, there being an intermediate cooling of the solution by means of the cooling medium flowing through the condenser.

This provides for automatic control of the process of operation in which the process is rapidly and automatically stabilized each time one the of the external factors varies, independently of whether the plant is employed for cooling or heating premises.

In accordance with a further aspect, the invention contemplates a sorption heat transfer plant, i.e. a refrigeration or heat pumping plant comprising a coolant cooled absorber, a solution cooled dephlegmatizer, a boiler with solution return and with a refrigerant circuit including an evaporator and a coolant cooled condenser, there being a refrigerant choke in the duct for return of the weak solution to the absorber, and in the inlet for the refrigerant to the evaporator there is a refrigerant choke. This plant is characterized in accordance with the invention for carrying out the novel process in that at the outlet of the evaporator there is an overheating sensor associated with the refrigerant choke and there is a condensate header on the upstream side of the refrigerant choke, in that the solution choke is permanently set to such a value that in conjunction with the control of the refrigerant choke a minor degree of overheating of the vapors emerging from the evaporator is maintained, in that the dephlegmatizer is designed with two stages and in that there is a coolant cooled intermediate cooler placed downstream from the condenser in terms of the flow of the coolant for the enriched solution and this intermediate cooler is placed in the supply duct for the enriched solution between the two dephlegmatizer stages, while a temperature switch for control of the heating power of the boiler has a temperature sensor responsive to refrigerant vapor issuing from the boiler.

Such a plant only requires a very small number of additional components, which make possible operation of the plant with a high efficiency or thermal ratio.

BRIEF DESCRIPTION OF THE DRAWING

The sole FIGURE of the drawing is a diagrammatic illustration of an embodiment of a sorption plant according to the invention.

DETAILED DESCRIPTION OF A PREFERRED EMBODIMENT OF THE INVENTION

The invention will now be described with reference to the working embodiment shown in the drawing.

The drawing shows an absorption plant in which a solution of ammonia in water is heated in a boiler 1 by the supply of heat at a rate $Q_k$ so that water-containing vapors, for example, ammonia-containing vapors are expelled at a high pressure $t_{ü}$. A rectifier 2 is connected to the output of the boiler 1 in which the expelled refrigerant vapors are concentrated. The return necessary in this respect to the rectifier 2 is through solution cooled counter-current dephlegmatizer 3 and 4 provided with an intermediate cooler 6. The very highly enriched coolant vapors 5 condense in a condenser 7 so that heat is released therefrom at a rate $Q_c$ and such condensate is collected in a condensate header 8 and subcooled in a subsequent heat exchanger 9, whose outlet is connected to a refrigerant choke 10 for control of the rate of flow of the refrigerant into an evaporator 11. By the supply of heat at a rate $Q_o$ from an energy source (not shown)

the refrigerant evaporates in the evaporator 11 and flows via a duct 18 through the heat exchanger 9 to an absorber 13.

Simultaneously, weak solution passes into the absorber 13, such solution being taken from the boiler 1 via a solution return duct 16 and passing through a second heat exchanger 15 and a solution choke 17 to the absorber 13, in which the weak solution is enriched to a higher concentration with the release of heat at a rate $Q_a$. The solution circuit is completed by a pump 14 and a supply duct 19 for conveying this enriched solution to the boiler.

The supply duct 19 for the enriched solution is a two-stage system through the dephlegmatizers such that between the two dephlegmatizers 3 and 4 the enriched solution is caused to pass through the intermediate cooler 6, which is so placed in relation to the condenser 7 that a coolant 20 in the form of air or water firstly flows around the condenser 7 and then around the intermediate cooler 6 so as to absorb heat at a rate $Q_z$. Following the second dephlegmatizing stage 3 the enriched solution is conveyed via the second heat exchanger 15 into the boiler 1.

The control of the process is undertaken using the refrigerant choke 10, the solution choke 17 for the return of the weak solution, the intermediate cooler 6 and a power controller 21 for the boiler 1. The solution choke 17 is permanently set in accordance with the design of the refrigerant choke 10. The refrigerant choke 10 is controlled to be in accord with the temperature of the coolant vapor issuing from the evaporator, the rate of injection of condensate into the dry evaporator 11 being such that at the outlet 12 of the evaporator there will be a slight degree of overheating of the vapors in relation to the pure refrigerant. For control of the boiler power, there is a temperature switch 17' responsive to the temperature of the refrigerant vapor 5 by way of a temperature sensor 23 located at the outlet of the dephlegmatizer 4 and at a certain maximum vapor temperature, switch 17' interrupts the supply of heat to the boiler and causes such supply of heat to be resumed when the temperature falls to a lower threshold.

An overheating sensor 22 located at the outlet 12 of the evaporator 11 detects an increase of pressure in the evaporator 11 and in the absorber 13, due to an increase in the cooling temperature $t_c$ or $t_a$ in the condenser or the absorber, respectively, causing a lower rate of heat release or due to an increase in the boiler power $Q_k$ causing an increased supply of heat into the process. In such a case, the supply of refrigerant to the evaporator 11 is reduced by the refrigerant choke 10, the refrigerant then accumulating in the condensate header 8. Due to this displacement of liquid refrigerant to the condensate header 8 so much refrigerant is abstracted from the circuit that the evaporation temperatures become established at a lower value as is necessary for the conditions of evaporation. This is brought about since the process concentrations continue to increase towards the absorption concentration until there is a slight degree of overheating at the evaporator outlet again. Then the absorber pressure and evaporator pressure go down so that the process will automatically stabilize again. The control takes place in each case on the reduction of the temperature level $t_o$ of the thermal coupling $Q_o$ at the evaporator.

If on the other hand, the condenser or absorber cooling temperature $t_c$ and $t_a$, respectively, or the thermal power $Q_k$ go down, or if the temperature level $t_o$ of the evaporator 11 goes up, a correspondingly higher rate of refrigerant will be allowed to flow by the refrigerant choke 10 from the refrigerant header 8 back into the circuit until it returns to its equilibrium condition.

Furthermore, compounded or concurrent changes in more than one marginal condition may be accepted by a control involving refrigerant choking and refrigerant displacement in the process. This makes it possible to bridge over short term failures of the boiler power, as for example in solar-heated boilers, or certain intervals in the cycles of installations heated by solid fuel by modifying the process concentrations.

By control of the boiler heating power $Q_k$, the plant is not shut down in the case of very unfavorable marginal conditions, and in fact by an increase in the temperature of vapor 5 the plant is further operated in an intermittent mode until the marginal conditions are changed back to be within the given permitted limits so that the plant will then run continuously. In the case of an increase in the boiler power $Q_k$ due to increase in the degasification range, the displacement of refrigerant into the condenser header 8 will take place. All control operations take place automatically so that on every change in one of the factors influencing the process, the process will be rapidly stabilized again and returned from its state of disequilibrium.

Lastly, the intermediate cooler 6 serves to vary the necessary cooling power in the dephlegmatizers 3 and 4 in accordance with the process conditions. Because of the arrangement of the intermediate cooler 6 at the condenser outlet 7 only the necessary return to the rectifier 2 is produced. The necessary high refrigerant vapor concentrations circuit in the refrigerating are achieved by the intermediate cooler 6 even if conditions are unfavorable because the greatly increased heat of dephelgmatisation may be removed through the intermediate cooler 7.

The above described automatic control steps lead to a coordinated control of an absorption process, and of a resorption process in such a way that economic and reliable operation of the plant is possible when external marginal conditions vary.

What is claimed is:

1. A method for the automatic control of a sorption heat transfer plant comprising heating a solution in a boiler to produce enriched coolant in the state of a vapor which flows in a refrigerant circuit through a condensor and an evaporator as a refrigerant to an absorber, cooling said vapor in said condensor to liquid state by a coolant flowing through said condensor, conveying a portion of the solution in the boiler in a solution circuit as a relatively weak solution to said absorber, producing an enriched solution at the output of the absorber from said refrigerant and said portion of the relatively weak solution, conveying said enriched solution in a coolant circuit to cool the vapor produced in the boiler whereafter said solution returns to said boiler, controlling the supply of the condensate from the condensor to the evaporator and the flow of the relatively weak solution to the absorber to provide a minor degree of overheating of the refrigerant at the outlet of the evaporator as related to pure refrigerant, controlling the heat supplied to the boiler in accordance with the temperature of the refrigerant vapor leaving the boiler, and effecting said cooling of the vapor produced in the boiler by the enriched solution from the absorber in two stages and cooling the enriched solution between said stages by the coolant flowing through the condensor whereafter said enriched solution is conveyed to said boiler.

2. A method as claimed in claim 1 wherein the control of the flow of the relatively weak solution from the boiler is fixed and the control of the flow of the refrigerant to the evaporator is variable and dependent on the conditions in said evaporator.

3. A method as claimed in claim 2 wherein the variable control of the flow of refrigerant to the evaporator is effected in response to the temperature of the refrigerant at the outlet of the evaporator.

4. A method as claimed in claim 3 comprising effecting heat exchange between the enriched solution returning to the boiler and the relatively weak solution flowing from the boiler to the absorber.

5. A method as claimed in claim 1 comprising collecting said condensate from the condensor in a header wherefrom the condensate is controllably supplied to the evaporator.

6. A sorption heat transfer plant comrising a coolant-cooled absorber, a solution-cooled dephlegmatizer, a boiler including a solution return circuit and a refrigerant circuit including an evaporator and a coolant-cooled condensor, said evaporator having an inlet for refrigerant from the boiler and an outlet for flow of vapor to said absorber, said solution return circuit including a duct for flow of relatively weak solution from said boiler to the absorber and a solution choke in said duct, a refrigerant choke in said refrigerant circuit at said inlet for the refrigerant to the evaporator, an overheating sensor coupled to the refrigerant choke, said overheating sensor being positioned at said outlet of the evaporator, a condensate header in said refrigerant circuit upstream of the refrigerant choke, said solution choke being permanently set to such a value that in conjunction with the control of the refrigerant choke by said sensor a minor degree of overheating of the vapor at said outlet of the evaporator is maintained, a coolant circuit including a supply duct connected to an outlet of said absorber for supply of enriched solution from said absorber to an inlet of said boiler, said dephlegmatizer being incorporated in said coolant circuit upstream of said inlet of said boiler and downstream of said outlet of said absorber, said dephlegmitizer including first and second stages disposed in said boiler, a coolantcooled intermediate cooler in said coolant circuit between the two dephlegmatizer stages, heat input means for said boiler, a temperature switch for control of said heat input means, and a temperature sensor responsive to the temperature of refrigerant issuing from said boiler for controlling said temperature switch.

7. A heat transfer plant as claimed in claim 6 comprising a heat exchanger connected to said coolant circuit and to said solution circuit for heat exchange between the solution flowing from the boiler to the absorber and the enriched solution returning to said boiler.

8. A heat transfer plant as claimed in claim 6 wherein said condensor and said intermediate cooler are disposed in a heat exchanger in which coolant flows over said condensor and then over said intermediate cooler.

9. A heat transfer plant as claimed in claim 8 wherein said condensor is disposed in said refrigerant circuit upstream of said condensate header.

* * * * *

UNITED STATES PATENT AND TRADEMARK OFFICE
CERTIFICATE OF CORRECTION

PATENT NO. : 4,706,464
DATED     : Nov. 17, 1987
INVENTOR(S) : Kreutmair, Josef

It is certified that error appears in the above—identified patent and that said Letters Patent is hereby corrected as shown below:

Title page:

The correct name of the assignee is --MAN Technologie GmbH--.

Signed and Sealed this

Seventh Day of February, 1989

*Attest:*

DONALD J. QUIGG

*Attesting Officer*    *Commissioner of Patents and Trademarks*